United States Patent [19]

Hillman

[11] Patent Number: 4,681,557
[45] Date of Patent: Jul. 21, 1987

[54] HOLDER FOR BICYCLE CHAINS

[76] Inventor: Tom V. Hillman, 528 Temple Hills Dr., Laguna Beach, Calif. 92651

[21] Appl. No.: 868,613

[22] Filed: May 30, 1986

[51] Int. Cl.$^4$ .............................................. F16H 7/24
[52] U.S. Cl. .................................... 474/119; 474/130
[58] Field of Search ....................... 474/119, 122, 130; 280/289 R

[56] References Cited

U.S. PATENT DOCUMENTS

| 242,020 | 5/1881 | Mitchell | 474/130 |
| 358,787 | 3/1887 | Railsback | 474/130 |
| 3,138,963 | 6/1964 | Prince | 474/130 |
| 4,109,544 | 8/1978 | Clark | 474/130 |
| 4,111,063 | 9/1978 | Journey | 474/130 |

FOREIGN PATENT DOCUMENTS 0712994 10/1941 Fed. Rep. of Germany ...... 474/130

Primary Examiner—Stephen J. Novosad
Assistant Examiner—Thuy M. Bui

[57] ABSTRACT

A holder for bicycle chains consisting of two primary and necessary elements, see drawing 1, the outwardly curved channel shaped chain retainer element 1, and the elongated box shaped dropout receiver element 2, these two elements are integrated to form a mechanical structure, or chain holder, which may be used to retain a bicycle drive chain upon the bicycle frame dropout thus freeing the bicycle sprocket assembly from its chain and thereby facilitating the removal and reinstallation of the bicycle rear wheel almost as if the chain were not there.

A holder for bicycle chains embodying the above primary elements 1 and 2 plus a secondary element 3 which is a handle, said handle provides good hand control of the chain holder and also provides a spring action snap on-off effect to retain the holder on the chain during a manipulation of the chain by the chain holder.

A holder for bicycle chains embodying the above three elements which allows the user to remove and reinstall the rear wheel of a bicycle as above without having to touch the bicycle drive chain with hands or any manipulative object other than my invention chain holder.

A holder for bicycle chains by the use of which time may be saved during the removal and reinstallation of the rear wheel of a bicycle. A holder for bicycle chains which is pocket sized and weighs less than one half ounce, and is a one piece injection molding.

2 Claims, 3 Drawing Figures

U.S. Patent  Jul. 21, 1987  4,681,557
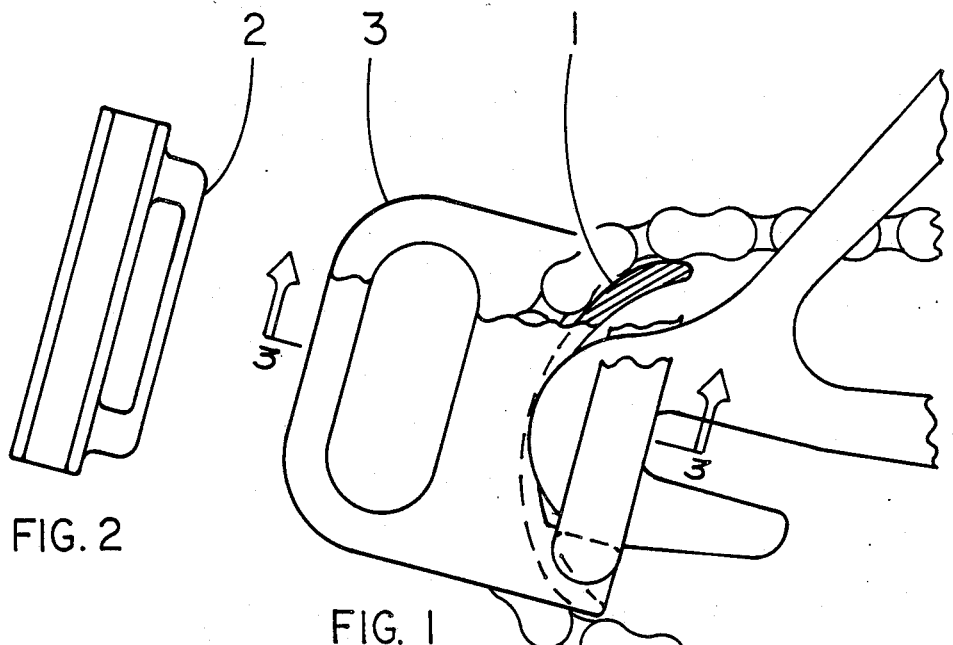
FIG. 2
FIG. 1
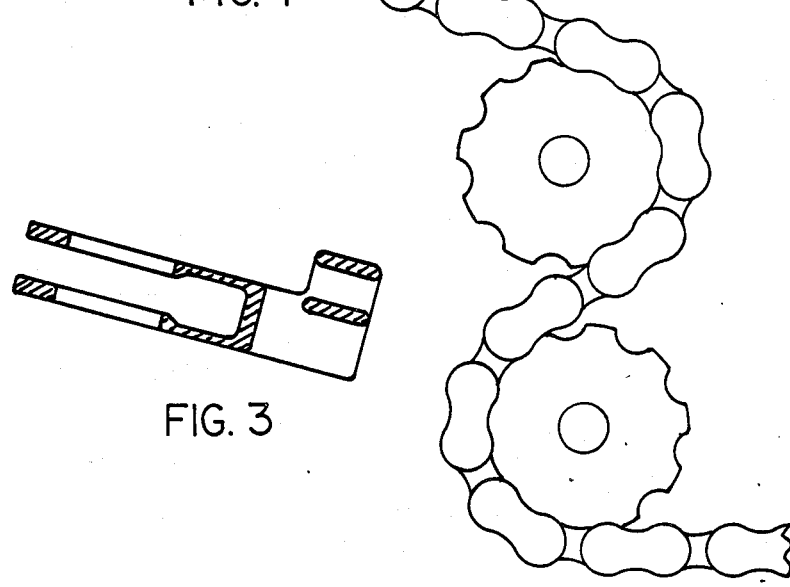
FIG. 3

HOLDER FOR BICYCLE CHAINS

BACKGROUND

1. Field of Invention

This invention relates to bicycles, specifically to a holder for bicycle chains, said holder to be an article of manufacture for retaining a bicycle drive chain to a bicycle dropout with or without a bicycle rear wheel in place, and to augment the removal and or installation of said wheel without having to touch the chain by hand or other device.

2. Discussion of Prior Art

Most experienced bicycle riders such as commuters or bicycle tourists have found it necessary to repair or replace a flat tire which usually occurs on the rear wheel, that being the most heavily loaded wheel. Heretofore, the removal and reinstallation of the rear wheel of a bicycle has been an odious task because of the need to handle the oily drive chain and because the chain tends to fall limp and does not cooperate with the removal or reinstallation of the rear wheel. Hand handling a bicycle drive chain is a messy business, and until now, hand handling has been the way it was done.

OBJECTS AND ADVANTAGES

The primary object of my invention chain holder is to provide a mechanical means to position and hold a bicycle drive chain on the bicycle in the normal operating position while the rear wheel is being removed, and also while the rear wheel is removed and also while the rear wheel is being reinstalled. All three conditions above may be accomplished in series or separately without touching the drive chain by hand or any device other than my invention chain holder, and as the bicycle chain is being controlled by the chain holder, the chain will not fall slack but will be retained in its normal functional position. Essentially the use of my chain holder will allow manipulation of the rear wheel of a bicycle almost as if the drive chain were not there.

A new and unexpected advantage given by the use of my invention chain holder is to reduce the time needed to replace a rear tire or wheel of a bicycle such as during a race or other time sensitive bicycle activity by retaining the position and contour of the drive chain on the bicycle thus freeing the rear wheel so that removal and replacement of the rear wheel can be efficiently accomplished without interference from or concern for the drive chain, thereby racing minutes may be saved.

An object of my chain holder is a small pocket sized light weight, ½ounce, rugged hand tool to be carried while bicycling and to reduce the inconvenience and mess of emergency rear wheel removal and replacement, and the same tool to be equally useful in the commercial shop to reduce the labor cost of rear wheel removal and replacement.

DESCRIPTION OF DRAWING

FIG. 1 is a front perspective view showing the two primary elements, an outwardly curved channel shaped chain retainer and an elongated box shaped dropout receiver that comprise my invention plus a third element: handle.

FIG. 2 is a rear view showing the concave underside of element 1.

FIG. 3 is a side view showing the thin flexible sides of element 1 and the thicker handle halves which is element 3.

PHYSICAL DESCRIPTION

The configuration I prefer for my invention Chain Holder is shown in the drawing 1 and is designed to be a one piece article of manufacture consisting of elements marked 1, 2, and 3 on the drawing 1, FIG. 1. Element 1 is an outwardly curved channel shaped chain retainer slightly wider inside than a bicycle chain and the bottom of appropriate thickness so that the concave underside of element 1 is slightly larger in radius than the small rear sprocket of a bicycle. Element 2 is an elongated box shaped dropout receiver which forms a recess shaped to receive the rear protrusion of a bicycle frame commonly called in the bicycle industry the dropout.

The material I prefer for my chain holder is any high-density plastic suitable for molding such as nylon, ABS, polyethelene, polypropolene, acetal, or polycarbonate and not to exclude other materials with similar qualities.

FUNCTION

Normally, when not in use, my chain holder may be carried in a bicycle rider's pocket or in the tool pouch of the bicycle because it is small and weighs less than one half ounce. In a bicycle repair shop the chain holder may hang by its handle near a work area. In any case, the chain holder may be readily available to secure a bicycle drive chain in position within a few seconds.

To use the holder grasp it by the elongated box shaped dropout receiver, element 2, and push it on to the top portion of the bicycle chain between the front and rear sprockets and seat the chain onto the curved surface of element 1 between the handle halves. Now lift the holder by its handle and move it around the rear of the rear sprocket and place the elongated box shaped receiver of the holder over the rear protrusion of the bicycle frame called the dropout, now the chain holder is in position and will stay there with the chain secured and free of the rear wheel sprocket until the above maneuver is reversed.

With the chain holder in position as described above, the bicycle rear wheel may be removed and replaced without touching the chain or the holder with hands or other objects and the chain will remain in the normal operating position but disconnected from its rear sprocket, also the pedal cranks of the bicycle may be rotated freely in either direction with or without the rear wheel installed. When reinstalling the wheel, just as in removing it, there is no need to touch the chain or the holder because the chain is being held in the exact position it should be in and allows complete freedom from the chain to manipulate the rear wheel. After the rear wheel is installed, then the chain holder may be removed by lifting it backward by its handle and upward then forward and pulled off the chain, just the reverse of installation, after the above maneuver the chain is automatically seated by the chain holder onto the small rear sprocket of the bicycle and ready to go.

CONCLUSION

During several years of bicycling I had many flat or worn out tires usually the rear, most of those incidents required removing the rear wheel of the bicycle making the repair then replacing the wheel, each time the rear wheel was removed and replaced I got black oily hands from the drive chain even if I held the chain with a towel or a stick or a piece of wire the chain would slip away and fall limp against the bicycle or sometimes on the ground. Trying to control a bicycle drive chain while removing or replacing a rear wheel was always a mess. So now I have a solution to the above old neglected and generally unrealized problem, and in my chain holder solution to that problem there exists a new and unexpected result which is speed, a vital factor in bicycle road racing. The use of my chain holder not only eliminates the old problem of of controlling the bicycle drive chain during removal and replacement of the rear wheel, but it also reduces the amount of time needed to remove and replace the rear wheel, by lifting, holding, locating and resetting the chain quickly and without hands or other objects touching the chain, thereby racing time is saved.

An alternate embodiment of my chain holder is to eliminate one handle half of element 3, see drawing 1, also this single handle embodiment was successfully tested as my first experimental model of August '85, see Disclosure Document No. 147702 dated March 17, '86.

Another embodiment of my chain holder is to eliminate the handle element 3 completely, thereby reducing the design to a basic chain holder of only two elements which is cheaper to manufacture but not as easy to use.

I claim:

1. An article of manufacture for retaining a bicycle drive chain to a bicycle dropout with or without a bicycle rear wheel in place comprising, an outwardly curved channel shaped chain retainer, and an elongated box shaped dropout receiver, wherein said chain retainer and said dropout receiver are attached side by side at their respective ends and said box shape forms a recess which is in the same direction as the concave underside of said chain retainer.

2. The article of manufacture of claim 1 further including a handle projecting in the same plane from one or each side of said channel.

* * * * *